United States Patent Office 3,671,263
Patented June 20, 1972

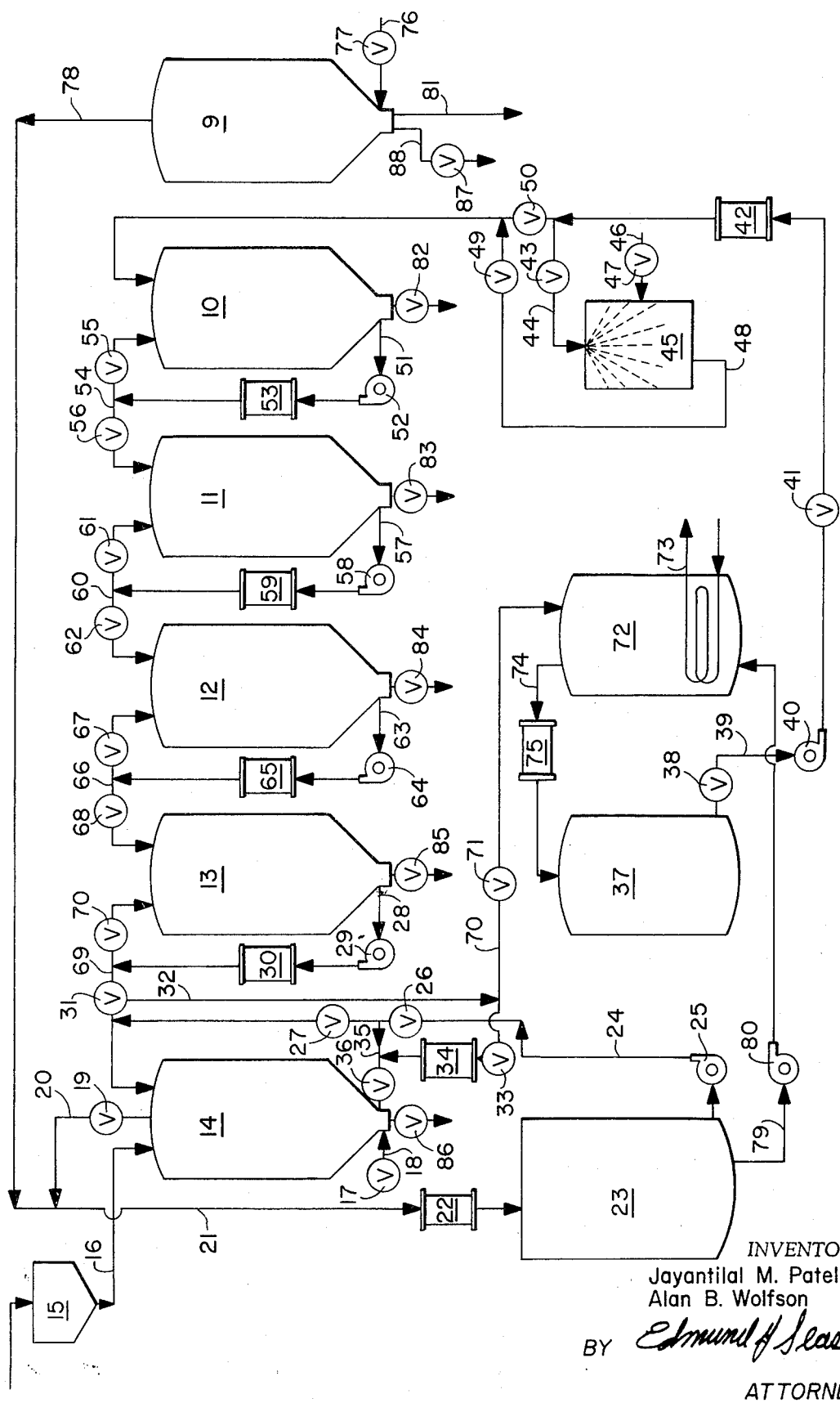

3,671,263
SEMI-CONTINUOUS COUNTERCURRENT DECAFFEINATION PROCESS
Jayantilal M. Patel, Reading, and Alan B. Wolfson, Springfield Township, Hamilton County, Ohio, assignors to The Procter & Gamble Company, Cincinnati, Ohio
Continuation of abandoned application Ser. No. 23,652, Mar. 30, 1970. This application Feb. 23, 1971, Ser. No. 118,184
Int. Cl. A23f 1/10
U.S. Cl. 99—70
9 Claims

ABSTRACT OF THE DISCLOSURE

A semi-continuous staged countercurrent extraction process involving high extraction temperatures, high pre-wetting moisture, high solvent exchange rates, and high solvent superficial velocity is used to substantially decrease caffeine extracting process times.

CROSS REFERENCE

This application is a continuation of earlier-filed co-pending application Ser. No. 23,652, filed Mar. 30, 1970 and now abandoned.

BACKGROUND OF THE INVENTION

In recent years the consumer market for decaffeinated coffees has substantially increased. Accordingly, a few commercial manufacturers in the United States are now selling decaffeinated coffee products. One of the major problems involved in preparing a decaffeinated coffee is the rather lengthy process times involved. For example, a typical decaffeination process beginning with green beans and resulting in decaffeinated green beans can and often does take from 31 to 43 hours and from 24 to 36 hours of this total process time is for the caffeine extracting step. Because of the lengthy process times involved, decaffeinated products are often substantially higher in cost than non-decaffeinated products.

Decaffeination using green coffee beans as a starting material and providing decaffeinated green coffee beans as the end product, typically involves five basic steps. These steps are steaming, pre-wetting, caffeine extracting, solvent stripping and finally drying and cooling. These five basic steps are nearly as old as decaffeination itself, and according to Sivetz, Coffee Processing Technology, 1963 Ed., Avi Publishing Company, vol. 2, page 207, these five steps have been practiced and well known since at least 1908. For literature disclosing these five basic process steps, see Sivetz, Coffee Processing Technology, vol. 2, page 207, U.S. Pat. 897,840, U.S. Pat. 936,392, U.S. Pat. 1,502,222, U.S. Pat. 1,957,358, and U.S. Pat. 1,977,416.

While disclosures relating to each of these basic steps can be found in the above-cited patents, in order to create the proper setting for applicants' invention, a brief description of each of these steps will be given herein.

Steaming.—In the steaming step, dry green coffee beans are steamed until the moisture contents of the beans are increased to within the range of from 16% to about 21%. Steaming times typically range from 1 to about 5 hours. During the steaming operation the cellular structure of the green coffee beans is softened and opened so that caffeine extraction can be more easily accomplished in subsequent steps. For further details relating to the basic steaming operation, see the above-cited Sivetz reference.

Pre-wetting.—During the pre-wetting step, water is added to the previously steamed green beans to increase the total moisture content to within the range of 30% to 40% by weight. The basic purpose of the pre-wetting procedure is to aid in the subsequent extraction of caffeine. For a detailed discussion of pre-wetting conditions, see Berry, U.S. Pat. 2,284,033. Patel et al., a concurrently filed, co-pending commonly assigned application, Ser. No. 118,182, entitled "An Improved Decaffeination Process," relates to using higher pre-wetting moistures to substantially reduce extraction times.

Caffeine extracting.—During extracting, a chlorinated hydrocarbon solvent capable of extracting caffeine is contacted with the previously steamed and pre-wetted green coffee beans. Typical chlorinated hydrocarbon solvents often employed are methylene chloride and trichloroethylene. Typically, the solvent and the beans are allowed to maintain contact at a temperature at or near the boiling point of the solvent for a time of from 24 to 36 hours. Of course, during this operation, spent solvent can continuously be replaced with fresh solvent. Alternatively, the same solvent can be utilized for the entire extraction operation. Extracting is continued until qualitative tests on spent solvent show the amount of caffeine contained in the solvent to be at the desired minimum level. For further details relating to solvent extraction of green coffee beans, see Weimer, U.S. Pat. 1,502,222 and Wilder, U.S. Pat. 1,977,416, and Wolfson et al., a concurrently filed, co-pending, commonly assigned application, Ser. No. 118,183, which relates to decreasing caffeine extracting times by using high solvent superficial velocities and high solvent exchange rates. Also see Berry, U.S. Pat. 2,309,092, which relates to a countercurrent decaffeination process utilizing water as the extracting solvent. The invention of this application differs from Berry in several respects. Two of the more important distinctions are (1) Berry does not teach the utilization of chlorinated hydrocarbon solvents, and (2) Berry does not teach solvent recirculation to provide increased solvent velocity rates as hereinafter described.

Solvent stripping.—Solvent stripping is usually accomplished by steam-stripping residual solvent from the decaffeinated green coffee beans which have previously been in contact with the caffeine-extracting solvent. Typically, steam is introduced into the extracting vessel at temperatures of from 212° F. to 240° F. and is continually passed over and through the previously extracted green beans until residual solvent can no longer be detected on the beans. Steam stripping can be conducted for from one up to twenty hours, but more typically is within the range of from one to eight hours. For details relating to the general process of steam stripping, see the above-cited references, and especially the Wilder reference.

Drying and cooling.—Subsequent to steam stripping, the beans are usually dried under vacuum at slightly elevated temperatures for a period of time ranging from four to ten hours. Thereafter the beans are cooled to room temperature and are then ready for subsequent roasting and conversion into a decaffeinated coffee product. For details relating to a non-vacuum drying process, see Lawrence et al., a co-pending commonly assigned, concurrently filed application, Ser. No. 118,185.

The process of this invention relates in large part to the extracting step.

SUMMARY OF THE INVENTION

This invention relates to an improved decaffeination process wherein green coffee beans are utilized as a starting material and the end product is decaffeinated green coffee beans. More specifically, the invention relates to an improvement in a decaffeinating process wherein said process involves the steps of steaming green coffee beans, pre-wetting the previously steamed coffee beans, caffeine extracting the previously steamed and pre-wet green coffee beans, solvent stripping residual solvent away from the green coffee beans, and drying and cooling the beans to provide decaffeinated green coffee beans, said process improvement involving a semi-continuous, countercurrent process of decaffeinating green coffee beans comprising:

(a) Steaming dry green coffee beans for from .25 hour to 1.0 hour at a temperature of 220° F. to 230° F. to provide a bean moisture content of from 16% to 18%.

(b) Pre-wetting the previously steamed green coffee beans to provide a bean moisture content of from 41% to 50% by weight;

(c) Countercurrently extracting caffeine from the previously steamed and pre-wet green coffee beans by introducing fresh caffeine extracting organic solvent at a temperature of from 120° F. to 250° F. and a pressure of from 30 p.s.i.g. to 200 p.s.i.g. into the first extraction column of an extraction train comprising a series of extracting columns containing green coffee beans, said first column containing the most nearly complete caffeine-extracted green coffee beans and the last column of said train containing fresh unextracted green coffee beans and the intermediate columns of said train each containing green coffee beans having progressively more caffeine, passing said solvent, in successive fashion, through the series of extracting columns comprising the extracting train, at a solvent superficial velocity with respect to the green coffee beans of from .15 ft./minute to 1.0 ft./minute, simultaneously, at a solvent exchange rate of from 2 pounds/pound of coffee/minute to 12 pounds/pound of coffee/minute, recirculating through each column a portion of said solvent which has previously passed through said column, and thereafter withdrawing said solvent from the last column of said extraction train; and (d) Steam stripping residual solvent away from the decaffeinated green coffee beans contained in the first column, at a temperature of from 220° F. to 230° F. for a time of from one hour to 4.0 hours; and (e) Removing decaffeinated green coffee beans from the steam-stripped first column.

BRIEF DESCRIPTION OF THE DRAWING

The figure is a flow chart showing one apparatus for practicing the process of this invention.

DETAILED DESCRIPTION OF THE INVENTION

The description of applicants' invention will be given with specific reference to the drawing. In the drawing there is shown an extraction train comprising extractors 10, 11, 12, 13, and 14. These extractors are connected in series so that solvent may continually flow through each extractor. Extractor 9, which will be explained in detail hereinafter, has completed the cycle and is therefore shown as ready for the steam stripping step and the discharge of decaffeinated green coffee beams. Occasionally, reference will be made to the first extraction column, and it is to be understood that the first column refers to column 10. Conversely, when reference is made to the last extraction column, it is to be understood that such reference means column 14. After startup, which is hereinafter explained in more detail, column 10 contains green coffee beans containing the least amount of caffeine; column 11 contains green coffee beans having slightly more caffeine than column 10, column 12 contains green coffee beans containing more caffeine than those in column 11, and column 13 contains green coffee beans containing more caffeine than those in column 12, and column 14, i.e. the last column, contains fresh green coffee beans containing nearly all if not all, of their caffein. In other words, the first column, i.e. column 10, contains coffee beans having the least caffeine therein, and column 14, the last column, contains green coffee beans containing the highest amount of caffeine. The flow of fresh caffeine-extracting organic solvent is generally in the direction of from column 10, through column 11, through column 12, through column 13, and through column 14. Therefore, as can be seen from the above description, the flow of solvent is countercurrent with respect to the flow of green coffee beans. The above brief description is with reference to an equilibrium or steady state system, and assumes that startup has been completed. The following description of the process of applicants' invention is with reference to the steady state condition previously described. Startup will be explained after describing the process of the invention. The process of the invention will be described in connection with the five basic steps, i.e. steaming, pre-wetting, caffeine extracting solvent stripping, and drying and cooling, which have heretofore briefly been described.

Steaming.—In the steaming step, dry green coffee beans are steamed until the moisture content of the beans is increased to within the range of from 16% to 18%. This is accomplished by exposing the beans to steam preferably at a temperature of 220° F. to 230° F. for from .25 hour to 1.0 hour. Of course, each column is steamed only once and is steamed just as it is placed onstream, i.e. as the last column in the position of column 14.

In the steaming operation, green coffee beans contained in hopper 15 are charged into extractor 14 through line 16. Line 16 is thereafter closed by a valve (not depicted on the drawing). Valve 17 is opened and steam is introduced through line 18 into the bottom of extractor 14. The steam passes through the green coffee beans contained in extractor 14 through open valve 19, and into line 20 and subsequently into line 21 through heat exchanger 22 which is maintained at a temperature of less than 80° F., which causes the steam to condense. The condensed steam, after passing through heat exchanger 22, passes into pre-wetting tank 23 wherein it is stored to be subsequently utilized as pre-wetting water as hereinafter explained.

After the above-described steaming procedure, the cellular structure of the green coffee beans is softened and opened so that caffeine contained in the beans can be more easily extracted during the hereinafter-described extracting procedure.

Pre-wetting.—Turning now to the pre-wetting step, wherein water is added to the previously steamed green coffee beans to preferably provide a total bean moisture content of from 41% to 50% by weight. Water contained in pre-wetting storage tank 23 drains into line 24 and is pumped by centrifugal pump 25 through open valves 26 and 27 and into the top of extractor 14, or through open valves 26 and 36 to the bottom of the extractor 14, or the pre-wetting water can be added partly to the top and partly to the bottom, either separately or simultaneously. Another mode of operation for adding pre-wetting water is to add all or part of it simultaneosuly with the chlorinated hydrocarbon caffeine-extracting solvent. This may be done by adding the water as described above and at the same time adding fresh solvent as follows: Solvent which has previously passed in downward fashion through the green coffee beans contained in extraction column 13 drains into line 28, passes through centrifugal pump 29, through heat exchanger 30, through open valve 31, into line 32, through valve 33 (valve 71 is closed) and heat exchanger 34 into line 35. Depending on the choice of adding to the bottom or top of extractor 14, the solvent together with the pre-wetting water can enter extractor 14 through line 35 and open valve 36, or through line 35, line 24 and open valve 27, or through both.

Caffeine extracting.—In the caffeine extracting step, solvent flows generally in the direction of through the first column, through the intermediate columns 11, 12, and 13, and finally, through the last column 14. The phrase "generally in the direction" is utilized because, as hereinafter explained, an important part of applicants' invention involves a recirculation of a portion of the solvent back through the column from which it just exited.

The chlorinated hydrocarbon organic solvent utilized herein can be solvents such as methylene chloride and trichloroethylene, which are the only two solvents presently approved by the Food and Drug Administration. However, other solvents such as chloroform can be used. The solvent cannot be water because water undesirably affects the flavor of the resulting product by leaching green solubles from the green coffee beans and these solubles are lost and therefore do not contribute to the desirable flavor and aroma of the resulting product.

Fresh solvent from fresh solvent tank 37 passes through valve 38 into line 39, through centrifugal pump 40, through valve 41 on line 39, and through heat exchanger 42, wherein the solvent is heated to temperatures within the required extracting temperature range of from 120° F. to 250° F. The solvent extraction temperature will be described in more detail later. After passing through heat exchanger 42 on line 39, the solvent passes through open valve 43 into line 44 wherein it is sprayed into solvent saturator 45. Solvent saturator 45 contains water introduced therein through line 46 and valve 47. Saturated solvent passes into line 48, through open valve 49, and back into line 39. The utilization of solvent saturator 45 is optional, and if it is desired that such a solvent saturator not be employed, valve 43 is closed and valve 50 on line 39 is opened, causing the solvent to bypass saturator 45.

It is preferred that fresh solvent pass through solvent saturator 45 prior to entrance into extraction column 10 because it has been unexpectedly found that solvent saturation with water prior to extracting provides flavor advantages in the resulting product.

After passing through saturator 45, and back into line 39, the now-saturated fresh solvent enters the top of extractor 10, i.e., the first extraction column. It is to be remembered that column 10 contains green coffee beans which have been previously extracted as the column passed through the relative positions of columns 14, 13, 12, and 11. Thus, the fresh saturated solvent is introduced into the first column, i.e. column 10, which contains green coffee beans having the least amount of caffeine contained therein. The solvent passes in downward fashion through the green coffee beans contained in extractor 10, and drains into line 51, through centrifugal pump 52, which pumps the solvent through heat exchanger 53, which insures that the caffeine-extracting organic solvent is at the required extracting temperature. After passing through heat exchanger 53, the solvent enters line 54 and has two alternative routes it can follow. First, the solvent can pass through valve 55 and return to the first extractor, i.e. column 10, and secondly, the solvent can pass through valve 56 into the top of extractor 11. The amount of solvent which has previously passed through extraction column 10 and which is recirculated back into extraction column 10 through partially open valve 55, controls the solvent superficial velocity. The solvent exchange rate is controlled by the amount of fresh solvent input into each extraction column and the rate of spent solvent withdrawal. The solvent superficial velocity and the solvent exchange rate will be discussed and defined hereinafter in detail because they form a critical part of applicants' invention. Valves 55 and 56 on line 54 are both partially opened so that a portion of the solvent recirculates into extractor 10, and a second portion of the solvent passes through open valve 56 and into the top of extractor 11.

As can be seen from the description of solvent flow through the green coffee beans contained in extractor 10, while generally speaking the solvent flow can be described as countercurrent, there is also involved some solvent recirculation.

In similar fashion, solvent passes through the green beans contained in extractor 11, into line 57, through pump 58, through heat exchanger 59, and into line 60 wherein a portion of the solvent is recirculated into extractor 11 through valve 61, and a portion of the solvent passes through valve 62 into extractor 12. From extractor 12 the solvent passes into line 63, through centrifugal pump 64, through heat exchanger 65, and into line 66 wherein a portion of the solvent is recirculated through valve 67 back into extractor 12, and the remaining portion passes through valve 68 and into the top of extractor 13.

After passing through extractor 13, solvent passes into line 28, through centrifugal pump 29, through heat exchanger 30, and into line 69 wherein a portion of the solvent is recirculated through open valve 70 back into extractor 13. The remaining portion of the solvent passes through valve 31 on line 32 and into line 70, through valve 71 and into spent solvent distilling tank 72. Distilling tank 72 is heated by heating coil 73 to provide temperatures above the boiling point of the chlorinated hydrocarbon caffeine-extracting solvent, the therefore the solvent is distilled and passes into line 74 through heat exchanger 75 wherein it is condensed and is then drained back into fresh solvent tank 37 for reuse. The caffeine-extracting step is now completed.

In the above general description of the extracting procedure utilizing the apparatus of the drawing, pre-wetting moisture, extracting temperature, extracting pressure, solvent superficial velocity, and solvent exchange rate, were mentioned as important parts of applicants' semi-continuous countercurrent extraction process. In addition, the solvent bean ratio, the number of columns contained in the extraction train, and the extraction cycle time are also important preferred aspects of applicants' invention. Each of these will be described in detail before describing the steam stripping and drying and cooling steps.

Turning now to the pre-wetting step, as previously mentioned, it has been surprisingly and unexpectedly discovered that when the pre-wetting moisture content of the previously steamed green coffee beans is increased prior to caffeine extracting to within the range of from 41% to 50% by weight, and most preferably within the range of 41% to 45%, caffeine extracting times can be significantly reduced, and the highgrown flavor of the coffee beans can be increased.

As previously indicated, the prior art shows prewetting moisture contents within the range of from 30% to 40% by weight. Heretofore it was thought that using higher moisture contents would give no advantages and in fact would be disadvantageous in that longer drying times would be necessitated in subsequent steps.

All other variables remaining constant, an increase in pre-wetting moisture of from 37% by weight of green coffee beans which is within the range taught in the prior art, to 42% which is within applicants' claimed range will provide a decrease in caffeine extracting time, and provide a significant increase in high grown coffee flavors which are very desirable to increase.

While not wishing to be bound by any theory, it is believed that increased pre-wetting moistures above those taught by the prior art, decrease caffeine extracting times because caffeine extracting is a mixed diffusion rather than a single diffusion of caffeine from the bean to the extracting solvent. It is believed that the caffeine contained in the green coffee beans diffuses out of the bean cells and into the pre-wetting water which is absorbed by the beans. When the previously pre-wet beans are contacted with extracting solvent, the caffeine diffuses from the water contained in the beans into the extracting solvent. Diffusion of the caffeine from bean-absorbed water into the solvent is easier and quicker than diffusion from the bean directly to the solvent, and therefore having a miximum amount of green bean water saturation reduces extracting time.

With regard to the increased high grown flavor produced by using increased pre-wetting moistures, no explanation is known for this totally unexpected but very beneficial result. Taste testing by expert flavor panels has shown that increasing pre-wetting moisture from below 30% incrementally up to 40% has a negative effect on high grown coffee flavors, that is, high grown flavors are markedly decreased. However, as soon as the percent of prewetting moisture increases above 40% and especially above 41% a marked increase in high grown flavor occurs. For example, increasing the pre-wetting moisture content from 32% to 40% decreases an expert panel flavor score from 7.5, which is good, to about 4.5 which is poor. A further increase in pre-wetting moisture from 40% to 42%, again all other process conditions remaining constant, provides an increase in expert panel flavor score of up to 7.0 which is an increase of 2.5 units and regarded as significant.

Turning now to increased extracting temperatures which forms a second preferred portion of applicants' invention, previously it had been though that using temperatures much above the boiling point of the caffeine-extracting organic solvent would provide no advantages and in fact may cause flavor degradation and pressure problems. However, using temperatures withiin applicants' range of 120° F. to 250° F. and within the preferred range of 140° F. to 210° F. provides significant decreases in extracting times.

Of course, as the temperatures used increase above the boiling point of the extracting solvent, increased pressure must be used to keep the solvent from vaporizing. While the exact pressure employed is really a function of the temperature used and the vapor pressure of the solvent, it has been found that pressures within the range of 30 p.s.i.g. to 200 p.s.i.g. are satisfactory for temperatures of from 120° F. to 250° F., and preferably 50 p.s.i.g. to 80 p.s.i.g. for temperatures within the preferred range of 140° F. to 210° F.

Turning now to the solvent superficial velocity past the green coffee beans contained in each of the extractors of the extraction train.

As used herein, the term "solvent superficial velocity" can be mathematically defined as $$\frac{\text{feet}^3 \text{ of solvent/minute}}{\text{feet}^2 \text{ of extractor}}$$

This fraction reduces to feet of solvent/minute and is a measure of the actual velocity of the solvent past the beans contained in each extractor 10, 11, 12, 13, and 14.

It has been surprisingly and unexpectedly discovered that when the solvent superficial velocity is carefully controlled to within the range of from .15 ft./minute to 1 ft./minute, and within the preferred range of .18 ft./minute to .25 ft./minute, caffeine extracting times can be substantially reduced. As previously mentioned, the solvent superficial velocity is controlled with respect to the apparatus shown in the drawing, by partially opening valves 55, 61, 67, and 70 to allow recirculating through each column a portion of the solvent which has previously passed through that column. In actual operation, it has been found convenient to place flow meters along lines 54, 60, 66, and 69 so that the exact opening of valves 55, 61, 67, and 70, needed to provide a particularly desirable solvent superficial velocity, can be readily determined.

Turning now to the solvent exchange rate, which is controlled by controlling the rate of fresh solvent input into the extraction train and the rate of spent solvent withdrawal from the extraction train.

The phrase "solvent exchange rate" as utilized herein is a measure of the amount of solvent exposed to a given amount of beans in a specific time. For example, a rate of one pound of solvent/pound of coffee beans/hour would mean that each pound of coffee beans contained in each extractor would be exposed to a total amount of 1 pound of solvent per every hour.

The solvent exchange rates utilized in this invention to provide substantial decreases in total decaffeination process times, are within the range of 2 pounds of solvent/pound of coffee/hour, to 12 pounds of solvent/pound of coffee/hour, and preferably within the range of 4 pounds of solvent/pound of coffee/hour, to 8 pounds of solvent/pound of coffee/hour. If rates slower than 2 pounds solvent/pound of coffee/hour are utilized, little effect upon total decaffeination process time is noted; on the other hand, if rates faster than 12 pounds solvent/pound of coffee/hour are employed, no further significant decrease in caffeine extracting times are seen.

In practicing the semi-continuous countercurrent caffeine extraction process of this invention, it is preferred that sufficient caffeine-extracting organic solvent be added to provide a minimum solvent-to-bean ratio of 3:1, and preferably, a ratio within the range of from 3:1 to 8:1, and most preferably, a ratio of from 3:1 to 5:1. A solvent-to-bean ratio of 3:1 is the minimum ratio needed for practical extraction processing, and the upper limit of 8:1 is a practical ratio based upon economics of processing.

With regard to the number of columns comprising the extraction train, no special criticality exists. However, from a practical standpoint, it is preferred that the number of columns range from about 4 to about 10 columns, and preferably from 6 to 9 columns. However, either more or less columns can be utilized if convenient to do so.

The process time, when utilizing applicants' conditions as defined above, generally ranges from 10 hours to 15 hours. Process time as defined herein refers to the amount of time that each new column remains onstream in the extraction train. Thus, process time is a measure of the total decaffeination process time. Process times, when using applicants' invention, are generally within the range of 10 to 15 hours, which are substantially less than prior art batch process times which generally range from 31 up to 43 hours. Therefore, practicing the process of this invention allows a decrease in over-all process time of from 51% to 77%. It is believed that the substantial reduction in process time, evidenced by applicants' invention, is a result of the combination of applicants' conditions. That is, the combination of semi-continuous countercurrent caffeine extracting with an organic solvent, coupled with increased pre-wetting moistures, increased extracting temperatures, high solvent superficial velocity, and high solvent exchange rate, all co-act and when combined provide a substantial decrease in process time without any flavor disadvantages. While the greatest advantage in time savings is seen when using all of the above preferred as well as critical conditions, if desired the semi-continuous process coupled with only the two critical limitations of solvent velocity and solvent exchange rate can be employed to provide significant process time decrease.

The cycle time is defined as the time interval between completion of decaffeination for two consecutive extraction columns, i.e. batches of green coffee beans. For example, cycle time refers to the time interval lapsing between removal of extractors 10 and 11 from the extraction train. For the process of this invention cycle time should be from 1 hour to 4.0 hours and preferably from 1.5 hours to 3.0 hours.

After completion of the steaming step, the pre-wetting step, and the caffeine-extracting step, previously described, the decaffeinated green coffee beans are now ready for steam stripping residual solvent and subsequent drying and cooling. With reference to the drawing, extractor 9 is in a position ready for steam stripping of residual solvent away from the decaffeinated green coffee beans. Extracting solvent previously has been removed from extractor 9 and cycled through the extraction train. Steam is introduced into extractor 9 through line 76 and valve 77. The steam passes through extractor 9 and through line 78, into line 21, through heat exchanger 22 and into pre-wetting tank 23. During the solvent stripping operation, the liquid introduced into pre-wetting tank 23 is a mixture of water and residual solvent which has been stripped away from the green coffee beans contained in extractor 9. Chlorinated hydrocarbon organic caffeine-extracting solvent, being heavier than water, sinks to the bottom of pre-wetting tank 23, and drains into line 79 and passes through pump 80 back into spent solvent distilling tank 72.

Solvent stripping in the manner just described is preferably conducted at a temperature of from 220° F. to 230° F. for a time of from 1.0 hour to 4.0 hours, after which no noticeable trace amounts of solvent are evident on the green coffee beans. The green coffee beans are then discharged through discharge line 81, and are ready for subsequent drying and cooling. During the steam stripping operation valve 87 on line 88 remains partially open to allow condensate trapped in extractor 9 to drain.

Drying and Cooling.—Subsequent to steam stripping at previously described, the wet decaffeinated green coffee beans have a moisture content of from about 45% to about 55%. Conventionally the beans are dried by a method such as vacuum drying at temperatures of from 120° F. to 240° F. for a period of time ranging from 4 to 10 hours. When vacuum drying is employed, a typical vacuum pressure is from 20 to 27 inches of mercury. Thereafter the beans are cooled, usually by convection methods, and the decaffeinated green beans are ready for subsequent roasting and conversion into a decaffeinated coffee product. For details relating to a non-vacuum drying procedure for decaffeinated green coffee beans, see the previously cited Lawrence application entitled "Non-Vacuum Drying of Decaffeinated Green Coffee Beans."

Roasting and grinding to provide a roast and ground decaffeinated coffee product can be done in conventional manners such as those described in Sivetz, vol. I, Chapter 8. Alternatively, the roast and ground coffee can be utilized to prepare an instant coffee product by preparing an extract therefrom and subsequently drying the extract in manners taught in Sivetz, vol. I, Chapters 9, 10, and 13.

Valves 82, 83, 84, 85 and 86 are drain valves for extractor 10, 11, 12, 13, and 14 respectively. These valves remain closed throughout the extraction operation of this invention, and are utilized only during the steaming and solvent stripping operations.

The following example is described with continuing reference to the drawing and is offered to illustrate but not limit the process of applicants' invention. The example is described with reference to a steady state condition which is attained after about 8 cycles. In startup each column is sequentially placed on the extraction train and the three basic steps are begun. For example, in startup column 10 is placed onstream and steaming is begun; after steaming of column 10 is completed, pre-wetting of column 10 is begun and simultaneously steaming of column 11 is begun. Thereafter extraction of column 10, in the manner previously described, is commenced and simultaneously steaming of column 12 is begun along with pre-wetting of column 11. This process is continued until 5 columns are on line and after 8 cycles it is found that equilibrium or steady state conditions are achieved. At this point, the elapsed time between starting one new column of undecaffeinated beans and finishing the decaffeinating of a second, previously started column of beans, will be 2.0 hours. This elapsed time is known as the cycle time. Because the first batches of green coffee beans are exposed to fresh solvent as opposed to partially used solvent, the caffeine extracting time is shortest for the first column placed on line, i.e. about 6 hours, and continually increases for each column added thereafter until the caffeine extracting time reaches 10.0 hours after 8 cycles. All of the conditions used during startup except the cycle time explained above are identical with those used during the process described in the example. In each instance the extraction columns were charged with 250 pounds of green coffee beans comprising a blend of Arabicas and Robustas. The operating volume of each extractor is 10.8 ft.³.

After completion of startup the first column, i.e. column 10, contains the batch of green coffee beans most nearly approaching 97% decaffeination, which is an industry-accepted standard; the beans in column 11 contain more caffeine and the intermediate columns in sequential order each contain higher levels of caffeine. Column 14 contains fresh green coffee beans. Column 9 as depicted has completed the cycle and is ready for solvent stripping and removal of decaffeinated beans. The example describes the entire decaffeination process beginning with the addition of column 14 as a new onstream column.

EXAMPLE

Steaming.—250 pounds of a blend of green coffee beans comprising Arabicas and Robustas (225 pounds on a dry weight basis) contained in hopper 15 are charged into extractor 14 through line 16. Line 16 is thereafter closed by a valve (not depicted in the drawing). Valve 17 is opened and steam at a temperature of 230° F. is introduced through line 18 into the bottom of extractor 14. The steam passes through the green coffee beans contained in extractor 14 through open valve 19 into line 20, and through heat exchanger 22 which is maintained at a temperature of 72° F. which causes the steam to condense. The condensed steam, after passing through heat exchanger 22, passes into pre-wetting tank 23 wherein it is stored to be subsequently utilized as pre-wetting water. Steaming is continued for 30 minutes, after which the total moisture content of the green coffee beans in column 14 has been increased to 17%.

Pre-wetting.—in the pre-wetting step, water is added to the previously steamed green coffee beans contained in extractor 14 to increase the bean moisture content ot 42% by weight. Water contained in pre-wetting storage tank 23 drains into line 24 and is pumped by centrifugal pump 25 through open valves 26 and 27 into the top of extractor 14. The total amount of water required to increase the moisture content from 17% to 42% is 117 pounds. The 117 pounds of pre-wetting water is added along with methylene chloride solvent through the bottom of extractor 14. The methylenec hloride solvent added to extractor 14 is solvent which has preivously passed in downward fashion through the green coffee beans contained in extraction column 13, drains into line 28, passes through centrifugal pump 29, and through heat exchanger 30 wherein it is adjusted to a temperature of 150° F. Continuing, the methylene chloride solvent adjusted to a temperature of 150° F. passes through valve 31, into line 32, through valve 33, and heat exchanger 34, and finally through open valve 36 into the bottom of extractor 14. Simultaneously the 117 pounds of pre-wetting water needed to provide a pre-wetting moisture of 42% is drained from pre-wetting tank 23 into line 24 through centrifugal pump 25, open valve 26, into line 35, and through valve 36 and into the bottom of extractor 14. The total amount of methylene chloride added is 1000 pounds and the solvent-to-bean ratio is 4:1.

Caffeine extracting.—In the caffeine-extracting step, solvent flows generally in the direction of through the first column, i.e. column 10, through the intermediate columns 11, 12 and 13, and finally through the last column 14. As hereinafter explained, solvent recirculation in order to provide a solvent superficial velocity of .2 ft./minute is practiced.

In this step, fresh methylene chloride solvent contained in tank 37 passes through valve 38 into line 39, through centrifugal pump 40, through valve 41 on line 39, and through heat exchanger 42 wherein the methylene chloride is heated to a temperature of 150° F. After being heated to 150° F. in heat exchanger 42, the methylene chloride passes through open valve 43 into line 44, wherein it is sprayed into solvent saturator 45. Solvent saturator 45 contains water introduced therein through line 46 and valve 47. The methylene chloride solvent being heavier than the water contained in saturator 45, and immiscible with the water, passes in downward fashion through the water and drains into line 48 through valve 49 and back into line 39.

Thereafter, the now-saturated methylene chloride is introduced at a temperature of 150° F. into the top of extractor 10. During the entire extraction procedure described hereinafter, the pressure maintained within the extraction train is 55 p.s.i.g. and is controlled to such a level by partially closing valve 71. The methylene chloride passes in downward fashion through the green coffee beans contained in extractor 10, and drains into line 51, through centrifugal pump 52 which pumps the solvent through heat exchanger 53, which insures that the methylene chloride is at a temperature of 150° F. After passing through heat exchanger 53 the methylene chloride enters into line 54. Valve 55 is partially opened and 74.5% of the methylene chloride solvent entering line 54 passes through valve 55 and is recirculated through column 10 through which it has previously passed. Recirculation of 74.5% of the solvent provides a solvent superficial velocity past the green coffee beans contained in extractor 10 of .2 ft./minute. The remaining 25.5% of the methylene chloride solvent entering line 54 after having passed through extractor 10 passes through partially opened valve 56 and enters the top of extractor 11.

In similar fashion, methylene chloride passes through the green coffee beans contained in extractor 11, into line 57, through pump 58, through heat exchanger 59, and into line 60, wherein 74.5% of the solvent is recirculated into extractor 11 through valve 61, and 25.5% of the methylene chloride passes through valve 62 into extractor 12. From extractor 12 the methylene chloride passes into line 63, through centrifugal pump 64, through heat exchanger 65, and into line 66 wherein 74.5% of the solvent is recirculated through valve 67 back into extractor 12, and the remaining 25.5% passes through valve 68 and into the top of extractor 13.

After passing through extractor 13, methylene chloride passes into line 28, through centrifugal pump 29, through heat exchanger 30 wherein it is maintained at a temperature of 150° F., and into line 69 wherein 74.5% of the solvent is recirculated through valve 70 back into extractor 13. The remaining 25.5% portion of the methylene chloride solvent passes through valve 31 on line 32 and into line 70, through valve 71 and into spent solvent distilling tank 72. Distilling tank 72 is heated by heating coil 73 to a temperature of 105° F. which is the boiling point of methylene chloride, and therefore the methylene chloride is distilled and passes into line 74 through heat exchanger 75, which is held at a temperature of 72° F. causing the methylene chloride to condense and drain back into fresh solvent tank 37 for re-use. During the entire caffeine-extracting step just described, the solvent input into extractor 10 is at a rate of 2.25 gallons/minute, and the solvent withdrawal from the last column of the extraction train, i.e. column 14, is at a rate of 2.25 gallons/minute. Utilizing the above solvent input rate and solvent withdrawal rate provides a solvent exchange rate of 6 pounds of solvent/pound of coffee beans contained in each extraction column per hour. The solvent-to-bean ratio utilized in the above described extracting procedure is 4:1. The process time utilized in the above described extracting procedure is 10.0 hours. The cycle time is 2.0 hours.

After completing the extraction cycle just described, each extraction column now containing wet decaffeinated green coffee beans having a moisture content of 46%, is in the relative position of extractor 9, as shown in the drawing. The methylene chloride solvent having been removed from extractor 9, steam is introduced into extractor 9 through line 76 and valve 77 at a temperature of 230° F. The steam passes through extractor 9 and through line 78 into line 21, through heat exchanger 22, and into pre-wetting tank 23. The liquid introduced into pre-wetting tank 23 is a mixture of water and residual methylene chloride solvent stripped from the beans contained in extractor 9. The methylene chloride solvent having a greater specific gravity than water sinks to the bottom of pre-wetting tank 23 and drains into line 79, passes through pump 80. and back into spent solvent distilling tank 72. Solvent stripping in the manner just described is conducted for 1.5 hours. The green coffee beans contained in extractor 9 are then discharged through discharge line 81 and ready for subsequent drying and cooling.

Quantitative analysis of the decaffeinated green coffee beans removed from extractor 9 reveals that the coffee beans are 97% free of caffeine.

Thereafter the wet decaffeinated green coffee beans having a moisture content of 46% are dried in a non-vacuum fluidized bed Jeffrey Dryer. Drying is commenced immediately upon completion of the solvent stripping step. Drying is conducted at atmospheric pressure for a period of 8 minutes using a hot air temperature of 350° F. which provides a bean surface temperature of 250° F.

Thereafter the non-vacuum dried decaffeinated green coffee beans are roasted and ground to regular grind size. Roasting is conducted in a Jubilee roaster at an air temperature maintained within the range of 400°–440° F. The end roast temperature is 440° F. and the total roast time is 12 minutes. The roasted beans are quenched with 5 gallons of water.

A panel of expert tasters prepares cups of coffee from the roast and ground decaffeinated product by placing 7.2 grams per cup of desired beverage along with 178 ml. of water per cup of desired beverage in a conventional percolator and allowing it to perk until the temperature reached 180° F., at which time the coffee beverage is poured into cups to be tasted by the expert panel.

In comparing the decaffeinated coffee product prepared by the process of this invention with other presently available decaffeinated coffee products being sold on the market, the panel notes no difference in flavor and aroma and rates the products are equally acceptable.

What is claimed is:

1. A semi-continuous, countercurrent process of decaffeinating green coffee beans comprising:
   (a) Steaming dry green coffee beans for from .25 hour to 1.0 hour at a temperature of 220° F. to 230° F. to provide a bean moisture content of from 16% to 18%;
   (b) Pre-wetting the previously steamed green coffee beans to provide a bean moisture content of from 41% to 50% by weight;
   (c) Countercurrently extracting caffeine from the previously steamed and pre-wet green coffee beans by introducing fresh caffeine extracting organic solvent at a temperature of from 120° F. to 250° F. and a pressure of from 30 p.s.i.g. to 200 p.s.i.g. into the first extraction column of an extraction train comprising a series of extracting columns containing green coffee beans, said first column containing the most nearly complete caffeine-extracted green coffee beans and the last column of said train containing fresh unextracted green coffee beans and the intermediate columns of said train each containing green coffee beans having progressively more caffeine, passing said solvent, in successive fashion, through the series of extracting columns comprising the extracting train, at a solvent superficial velocity with respect to the green coffee beans of from .15 ft./minute to 1.0 ft./minute, simultaneously, at a solvent exchange rate of from 2 pounds/pound of coffee/minute to 112 pounds/pound of coffee/minute, recirculating through each column a portion of said solvent which has previously passed through said column, and thereafter withdrawing said solvent from the last column of said extraction train; and
   (d) Steam stripping residual solvent away from the decaffeinated green coffee beans contained in the first column, at a temperature of from 220° F. to 230° F. for a time of from 1.0 hour to 4.0 hours; and (e) Removing decaffeinated green coffee beans from the steam-stripped first column.

2. The process of claim 1 wherein the pre-wetting moisture content is from 41% to 45%.

3. The process of claim 1 wherein the step (c) the temperature is from 150° F. to 210° F.

4. The process of claim 1 wherein in step (c) the pressure is from 50 p.s.i.g. to 80 p.s.i.g.

5. The process of claim 1 wherein in step (c) the solvent superficial velocity is from 18 ft./minute to .25 ft./minute.

6. The process of claim 1 wherein in step (c) the solvent exchange rate is from 4 pounds/pound of coffee/minute to 8 pounds/pound of coffee/minute.

7. In a decaffeination process comprising the steps of steaming green coffee beans, pre-wetting the previously steamed green coffee beans, extracting caffeine from the previously steamed and pre-wet green coffee beans, steam stripping residual solvent away from the extracted green coffee beans, and drying and cooling the decaffeinated green coffee beans, the improvement comprising countercurrently extracting caffeine from the previously steamed and pre-wet green coffee beans by introducing fresh caffeine extracting organic solvent at a temperature of from 120° F. to 250° F. and a pressure of from 30 p.s.i.g. to 200 p.s.i.g. into the first extraction column of an extraction train comprising a series of extractnng columns containing green coffee beans, said first column containing the most nearly complete caffeine-extracted green coffee beans and the last column of said train containing fresh unextracted green coffee beans and the intermediate columns of said train each containing green coffee beans having progressively more caffeine, passing said solvent, in successive fashion, through the series of extracting columns comprising the extracting train, at a solvent superficial velocity with respect to the green coffee beans of from .15 ft./minute to 1.0 ft./minute, simultaneously at a solvent exchange rate of from 2 pounds/pound of coffee/minute to 12 pounds/pound of coffee/minute, recirculating through each column a portion of said solvent which has previously passed through said column, and thereafter withdrawing said solvent from the last column of said extraction train.

8. The process of claim 7 wherein the temperature is from 150° F. to 210° F. and the pressure is from 50 p.s.i.g. to 80 p.s.i.g 9. The process of claim 7 wherein the solvent superficial velocity is from .18 ft./minute to .25 ft./minute, and the solvent exchange rate is from 4 pounds/pound of coffee/minute to 8 pounds/pound of coffee/minute.

References Cited

UNITED STATES PATENTS

| 2,284,033 | 5/1942 | Berry | 99—69 |
| 2,309,092 | 1/1943 | Berry et al. | 99—70 |
| 1,977,416 | 10/1934 | Wilder | 99—70 |

OTHER REFERENCES

Sivetz: Coffee Processing Technology, vol. II, 1963, pp. 207.

FRANK W. LUTTER, Primary Examiner

W. L. MENTLIK, Assistant Examiner

PO-1050
(5/69)

UNITED STATES PATENT OFFICE
CERTIFICATE OF CORRECTION

Patent No.      3,671,263      Dated June 20, 1972

Inventor(s) Jayantilal M. Patel and Alan B. Wolfson

It is certified that error appears in the above-identified patent and that said Letters Patent are hereby corrected as shown below:

| | |
|---|---|
| Col. 3, line 55 | "beams" should be -- beans -- |
| Col. 4, line 12 | insert a comma after "extracting" |
| Col. 4, line 54 | "neosuly" should be -- neously -- |
| Col. 6, line 17 | "the", first instance, should be -- and -- |
| Col. 10, line 38 | "methylenec hloride" should be -- methylene chloride -- |
| Col. 10, line 39 | "preivously" should be -- previously -- |
| Col. 12, line 67 | "112 pounds/pound of coffee/minute" should be -- 12 pounds/pound of coffee/minute -- |
| Col. 13, line 5 | "the step" should be -- in step -- |
| Col. 13, line 10 | "18 ft." should be -- .18 ft. -- |
| Col. 13, line 27 | "extractnng" should be -- extracting -- |

Signed and sealed this 19th day of December 1972.

(SEAL)
Attest:

EDWARD M. FLETCHER, JR.
Attesting Officer

ROBERT GOTTSCHALK
Commissioner of Patents